UNITED STATES PATENT OFFICE.

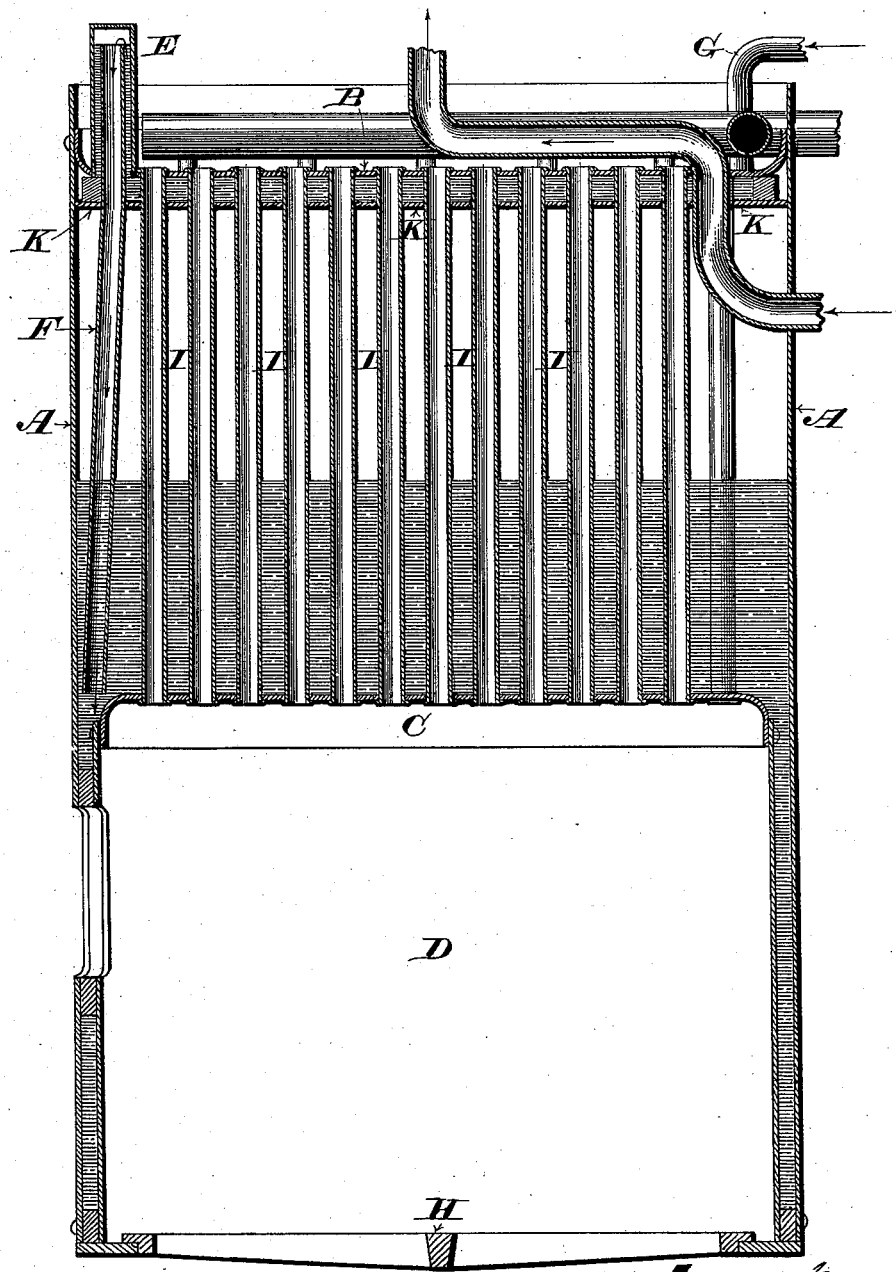

FREDERICK L. WATEROUS, OF SOUTH ST. PAUL, MINNESOTA.

BOILER.

SPECIFICATION forming part of Letters Patent No. 400,529, dated April 2, 1889.

Application filed July 30, 1888. Serial No. 281,408. (No model.)

*To all whom it may concern:*

Be it known that I, FREDERICK L. WATEROUS, of South St. Paul, in the county of Dakota and State of Minnesota, have invented certain new and useful Improvements in Upright Boilers; and I do hereby declare that the following is a full, clear, and exact description of the invention, which will enable others skilled in the art to which it pertains to make and use the same, reference being had to the accompanying drawing, and to the letters of reference marked thereon, which form a part of this specification.

The main object of my invention is to protect and preserve the upper ends of the flues and their joints with the upper flue-sheet, and in the attainment of that end to heat the water with which the boiler is supplied.

It consists, essentially, in providing a water-chamber around the upper ends of the flues with suitable connections, whereby water is constantly maintained in contact with the upper flue-sheet where said flues join the same, and of certain peculiarities of construction and arrangement, hereinafter specifically set forth.

The accompanying drawing represents a vertical median section of a boiler to which my improvements are applied.

In upright boilers as heretofore made the upper ends of the vertical flues are subjected to great variations of temperature, causing unequal contraction and expansion, which in a short time produce leakage where they join the upper head or flue-sheet, particularly in fire-engine boilers, which are "fired" hard. To obviate this difficulty is the main object I seek to attain by my improvements shown in the accompanying drawing, in which—

A represents the shell, B the upper head or flue-sheet, C the lower head or flue-sheet, D the fire-box, H the grate, and I the vertical tubes or flues, of an upright boiler of the ordinary or any suitable construction.

A short distance—say one and a half inch—below the upper flue-sheet, B, I place a horizontal diaphragm or partition, K, which incloses therewith a water and steam tight chamber about the upper end of the flues I I, passing through it. The joints in the partition K around the flues are made steam and water tight in any suitable manner. G represents the supply-pipe, through which water is pumped into said chamber. E is a stand-pipe rising from the upper flue-sheet, B, and communicating at its lower end with said water-chamber. F is a pipe extending upwardly into the stand-pipe E and downwardly through the partition K, and opening at its upper end into the upper part of said stand-pipe and at its lower end into the water-leg or lower part of the boiler.

In operation the feed-water of the boiler is pumped into the chamber between the upper flue-sheet and partition K through the pipe G, and, rising in the stand-pipe, overflows into the pipe F and through it into the boiler. The outlet from said chamber being placed above it maintains the water therein constantly in contact with the upper flue-sheet, B, and the upper ends of the flues I I, and prevents their becoming overheated or being subjected to great and sudden variations of temperature, thus avoiding leaks and preserving those parts which would otherwise be burned or injured. In passing through said chamber around and between the hot flues, the water is heated before it enters the boiler, and the device thus serves incidentally as a feed-water heater. Below the diaphragm or partition K the flues I I pass through the steam-space of the boiler in the usual way, and thus superheat the steam. When the boiler is filled with water ready for steaming, the pressure of the steam will back the water up through the pipe F, thereby keeping the water-space around the tops of the flues always filled. This action, which is practically automatic, is constantly taking place, and when the operation of the pump is discontinued the supply of water in said water-space is constantly maintained.

I claim—

1. In an upright boiler, a water-chamber inclosed around the upper end of the flues by the upper flue-sheet, and a diaphragm located a little below it, an overflow opening from said chamber above said flue-sheet, whereby water is maintained constantly in contact with said flue-sheet and the upper ends of the flues, substantially as and for the purposes set forth.

2. In an upright boiler, the combination, with the upper flue-sheet, of a diaphragm located a little below and inclosing therewith around the upper ends of the flues a water-space, a supply-pipe opening into said chamber, and an eduction-pipe leading out therefrom above said flue-sheet, substantially as and for the purposes set forth.

3. In an upright boiler, a water-chamber around the upper ends of the flues formed by a double head, consisting of the upper flue-sheet and a diaphragm located a little below it, a water-supply pipe leading into said chamber, a stand-pipe opening at its lower end into and extending above said chamber, and an eduction-pipe leading out of said stand-pipe above the upper flue-sheet into the lower part of the boiler, substantially as and for the purposes set forth.

In testimony that I claim the foregoing as my own I affix my signature in presence of two witnesses.

FREDERICK L. WATEROUS.

Witnesses:
W. HOLMES,
FRANK J. WATEROUS.